(12) United States Patent
Ishida et al.

(10) Patent No.: US 7,905,264 B2
(45) Date of Patent: Mar. 15, 2011

(54) RUNFLAT TIRE

(75) Inventors: Takaaki Ishida, Kobe (JP); Fumikazu Yamashita, Kobe (JP); Akira Kamigoro, Kobe (JP); Yasuaki Kuniyasu, Kobe (JP); Yurie Tanami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 978 days.

(21) Appl. No.: 11/657,100

(22) Filed: Jan. 24, 2007

(65) Prior Publication Data
US 2007/0169869 A1 Jul. 26, 2007

(30) Foreign Application Priority Data
Jan. 25, 2006 (JP) .................. 2006-016710

(51) Int. Cl.
*B60C 17/00* (2006.01)
*B60C 17/04* (2006.01)
*B60C 17/06* (2006.01)
(52) U.S. Cl. .................. 152/516; 152/517; 152/520
(58) Field of Classification Search .................. 152/516, 152/517, 518, 519, 520
See application file for complete search history.

(56) References Cited

U.S. PATENT DOCUMENTS

| | | | | |
|---|---|---|---|---|
| 4,045,362 A | * | 8/1977 | Kuan et al. | 508/216 |
| 4,213,491 A | * | 7/1980 | Pope et al. | 152/504 |
| 5,058,646 A | | 10/1991 | Kajikawa et al. | |
| 6,923,233 B1 | | 8/2005 | Girault et al. | |
| 2004/0112496 A1 | * | 6/2004 | Colantonio et al. | 152/510 |

FOREIGN PATENT DOCUMENTS

| | | | |
|---|---|---|---|
| GB | 867103 | | 5/1961 |
| JP | 50-111704 | | 9/1975 |
| JP | 3-104710 | * | 5/1991 |
| JP | 2003-94912 | * | 4/2003 |
| JP | 2005-67315 A | | 3/2005 |
| JP | 8-337101 A | | 12/2006 |

OTHER PUBLICATIONS

Machiine translation of JP 2003-94912, Kurokawa, M., Apr. 2003.*

* cited by examiner

*Primary Examiner* — Justin Fischer
(74) *Attorney, Agent, or Firm* — Birch, Stewart, Kolasch & Birch, LLP

(57) ABSTRACT

A pneumatic tire comprises a sidewall reinforcing rubber disposed axially inside the carcass in each of the sidewall portion, and in order improving the ride comfort during normal running without deteriorating runflat performance, the axially inner surface of the sidewall reinforcing rubber is provided with a circumferentially extending groove. When the tire is deflated, the groove in the ground contacting patch is closed and the sidewall reinforcing rubber supports the tire load. When the tire is inflated-normally, as the sidewall portion can be bent around the groove, the ride comfort is improved.

8 Claims, 8 Drawing Sheets

RUNFLAT TIRE

The present invention relates to a runflat tire, more particularly to a sidewall structure capable of improving ride comfort during normal running without deteriorating runflat performance.

A runflat tire (b) which is, as shown in FIG. 13, provided in each sidewall portion (c) with a sidewall reinforcing rubber (d) having a crescent shape has been proposed, for example as shown in U.S. Pat. No. 5,058,646. The crescent-shaped sidewall reinforcing rubber (d) is disposed axially inside the carcass (a) in order to increase the bending rigidity of the tire sidewall portion (c) to thereby support the tire load during runflat conditions.

In this structure, however, as the bending rigidity is increased always, namely, during normal running and runflat conditions, a deterioration in the ride comfort during normal running is inevitable.

It is therefore, an object of the present invention to provide a runflat tire, in which the ride comfort during normal running can be improved without deteriorating the runflat performance.

According to the present invention, a runflat tire is a pneumatic tire having a tread portion, a pair of sidewall portions, and a pair of bead portions, and the tire comprises a carcass extending between the bead portions through the tread portion and sidewall portions, and a sidewall reinforcing rubber disposed axially inside the carcass in each of the sidewall portions, wherein the sidewall reinforcing rubber is provided with a groove extending circumferentially of the tire and opened toward the inside of the tire, and the groove has a cross sectional shape and dimensions such that when the normally loaded tire is deflated, the groove in a ground contacting patch is closed.

Therefore, when the tire is deflated, in the ground contacting patch, as the groove is closed, a part of the sidewall reinforcing rubber on the radially outside of the groove and a part of the sidewall reinforcing rubber on the radially inside of the groove function as one united body, and accordingly, like in the conventional sidewall reinforcing rubber, the bending rigidity of the tire sidewall portion is increased to support the tire load during runflat conditions. In the normally-inflated, normally-loaded conditions, contrary, as the groove is opened even in the ground contacting patch, the sidewall portions can easily bend around the groove. Accordingly, the tire can absorb vibrations and shock from the roads, and the ride comfort is improved.

Embodiments of the present invention will now be described in detail in conjunction with the accompanying drawings.

Figure 1:
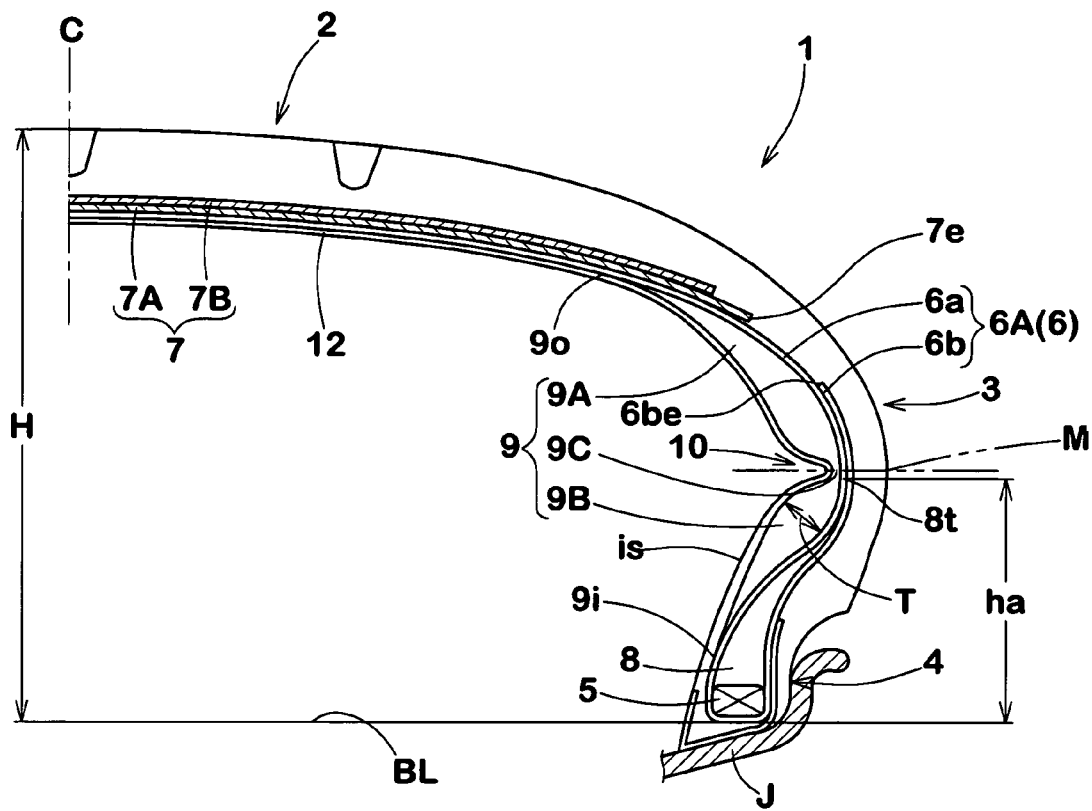
FIG. 1 is a cross sectional view of a runflat tire according to the present invention showing the normally-inflated unloaded state of the tire.

According to the present invention, runflat tire 1 is a pneumatic tire having a tread portion 2, a pair of axially spaced bead portions 4 each with a bead core 5 therein, and a pair of sidewall portions 3 extending between the tread edges and the bead portions 4. The tire 1 comprises: a carcass 6 extending between the bead portions 4; a belt 7 disposed radially outside the carcass 6 in the tread portion 2; and a sidewall reinforcing rubber 9 disposed axially inside the carcass 6 in each of the sidewall portions 3.

In this embodiment, the runflat tire 1 is a low-aspect radial tire for passenger cars. But, the present invention can be applied to various tires in which ride comfort is required.

The carcass 6 is composed of at least one ply 6A of rubberized cords arranged radially at an angle in the range of from 75 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of polyester cords arranged radially at an angle of 90 degrees with respect to the tire equator C. Aside from the polyester cords, organic fiber cords, e.g. aromatic polyamide, nylon, rayon and the like can be used alone or in combination. Further, metal cords can be used.

The belt comprises a breaker 7 and optionally a band (not shown).

The breaker 7 comprises: at least two cross plies 7A and 7B of high modulus cords laid at an angle of from 10 to 35 degrees with respect to the tire equator C. For the breaker cords, steel cords and/or high modulus organic fiber cords, e.g. polyethylene naphtarete(PEN), polyethylene terephthalate(PET), aramid, rayon and the like can be used. In this example, the breaker consists of the two cross breaker plies 7A and 7B of steel cords.

The band is composed of a cord or cords wound on the radially outside of the breaker at a small angle of at most about 5 degrees for example almost zero degree with respect to the tire equator C. For example, organic fiber cords such as nylon can be used.

The bead portions 4 are each provided between the main portion 6a and turned up portion 6b of the carcass with a bead apex 8. The bead apex 8 is made of a hard rubber having a JIS A hardness of not less than 65, more preferably not less than 75, but not more than 95, more preferably not more than 95 in order to increase the bending rigidity of the bead portion 4 and improve stability during cornering. The bead apex 8 extends radially outwardly from the radially outside of the bead core 5, while tapering towards its radially outer end 8t.

As to the radial height ha of the outer end 8t from the bead base line BL, if too low, the durability of the bead portion during runflat conditions becomes decreased. If too high, the ride comfort during normal running becomes deteriorated.

Therefor, the height ha is preferably set in a range of not less than 10%, more preferably not less than 30%, but not more than 55%, more preferably not more than 45% of the tire section height H.

Here, the tire section height H is the radial distance from the bead base line BL to the radially outermost point of the tread portion 2 under the normally inflated unloaded state of the tire.

The normally inflated unloaded state is such that the tire is mounted on a standard wheel rim and inflate to a standard pressure but loaded with no tire load. In addition, the normally inflated loaded state is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The above-mentioned turned up portion 6b of carcass ply 6A is extended radially outwardly beyond the radially outer end 8t of the bead apex 8, and the radially outer end 6b e of the turned up portion 6b is positioned radially outside the maximum section width position m of the carcass 6 in order to avoid stress concentration thereon and also withstand a large tensile stress during runflat situations.

The above-mentioned sidewall reinforcing rubber 9 is disposed in each sidewall portion 3 to abut on the inside of the carcass 6, more strictly, abut on the topping rubber on the inside of the carcass cords in the carcass main portion 6a.

The sidewall reinforcing rubber 9 extends radially outwardly and inwardly from the maximum section width position m of the carcass 6 along the inside of the carcass 6 so that a radially outer end 9o is positioned axially inside the axial edge 7e of the belt 7 (namely, beneath the belt), and a radially inner end 9o is positioned radially inside the radially outer end 8t of the bead apex 8, but radially outside the bead core 5.

As to the hardness of the sidewall reinforcing rubber 9, if too small, it is difficult to reinforce the sidewall portions. If too large, it is difficult to improve the ride comfort. Therefore, the JIS type-A durometer hardness thereof is preferably set in the range of not less than 65, more preferably not less than 70, still more preferably not less than 75, but not more than 99, still more preferably not more than 95. Further, it is preferable that the sidewall reinforcing rubber 9 has a complex elastic modulus of in a range of not less than 8 MPa, more preferably not less than 10 MPa, but not more than 35 MPa, more preferably not more than 30 MPa; and a loss tangent delta in a range of not less than 0.05, but not more than 0.07 in order to control the heat generation and thereby to improve the runflat performance.

Here, the loss tangent and complex elastic modulus refer to the values measured at a temperature 70 deg.C., an initial elongation of 10%, an amplitude of dynamic strain of plus/minus 1%, and a frequency of 10 Hz by the use of a viscoelastic spectrometer "model VES F-3" manufactured by IWAMOTO SEISAKUSYO.

For the sidewall reinforcing rubber 9, various rubber polymers can be used. But, preferably, diene rubber, specifically, natural rubber, isoprene rubber, styrene butadiene rubber, chloroprene rubber, and acrylonitrile butadiene rubber can be used alone or in combination.

According to the present invention, the inner surface of the sidewall reinforcing rubber 9 is provided with an annular groove 10 extending continuously around the tire rotational axis. Accordingly, the groove 10 has a radially outer wall 10a and a radially inner wall 10b, whose axially outer ends are connected with each other through a groove bottom 10c. The groove 10 has a v-shaped cross-sectional shape in which the walls 10a and 10b are opened at an acute angle.

The thickness of the sidewall reinforcing rubber 9 is smoothly and continuously decreased from the grooved part (10) to each of the radially outer end 9o and inner end 9i. As a result, as shown in FIG. 1, the radially outer part 9A between the bottom of the groove 10 and the outer end 9o, and the radially inner part 9B between the bottom of the groove 10 and the inner end 9i each have a spindle-shaped or streamlined cross sectional shape. Between the two parts 9A and 9B, a thin part 9C having a thickness (t) is formed at the groove bottom 10c.

In the case of passenger car tires or tires having similar sizes, the thickness (t) of the sidewall reinforcing rubber 9 at the groove bottom 5P is preferably not more than 8 mm, more preferably not more than 6 mm, but not less than 1 mm, more preferably not less than 2 mm. If more than 8 mm, it becomes difficult to improve the ride comfort. If less than 1 mm, as the durability of the sidewall reinforcing rubber 9 is decreased in the grooved part and as a result there is a possibility of deteriorating the runflat performance.

As to the maximum thickness T of the sidewall reinforcing rubber 9, if too small, it is difficult to provide a sufficient runflat performance. If too large, the ride comfort tends to deteriorate. Therefor, the maximum thickness T is preferably in a range of not less than 5 mm, more preferably not less than 7 mm, but not more than 20 mm, more preferably not more than 15 mm. Incidentally, the maximum thickness T occurs in the vicinity of each edge of the groove 10. The thickness is measured perpendicularly to the axially outer surface of the sidewall reinforcing rubber 9 or the inner surface of the carcass 6 under the normally inflated unloaded state of the tire.

In order to prevent cracks and stress concentration, the groove bottom 10c is formed with a radius Rb of curvature in a range of not less than 1 mm, preferably not less than 2 mm, more preferably not less than 3 mm, but not more than 7 mm, more preferably not more than 5 mm under the normally inflated unloaded state.

The cross sectional shape and dimensions of the groove 10 is determined such that the groove 10 is not closed completely even when the normally inflated tire is loaded with normal tire loads preferably even the maximum tire load, but the groove 10 is closed completely when the loaded tire is deflated. Therefore, when the tire is normally inflated, as the groove 10 is opened, the sidewall portion 3 can be easily bent at the grooved part, changing the opening width. As a result, the ride comfort can be improved.

Figure 2:
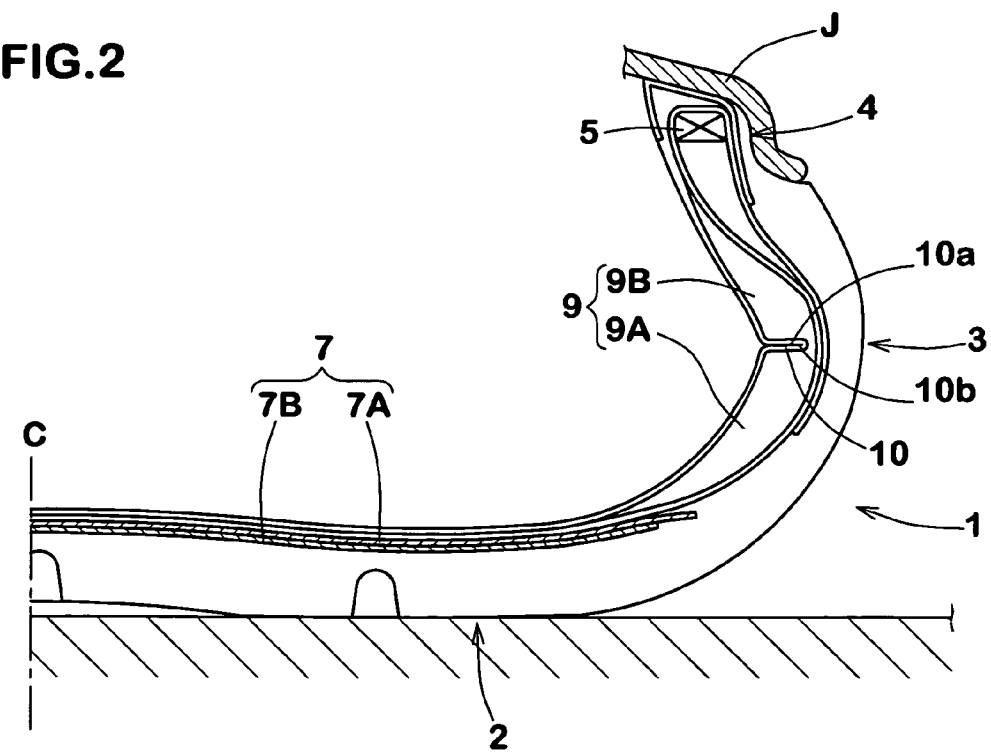
FIG. 2 is a cross sectional view of the runflat tire showing the ground contacting patch of the tire in a deflated state.

On the other hand, when the tire is deflated, the outer wall 10a and inner wall 10b in the ground contacting patch contact with each other as shown in FIG. 2, and the radially outer part 9A and radially inner part 9B function as an integral body having a crescent shape. As a result, the vertical stiffness of the sidewall portion is increased, and the runflat performance of the same level as the conventional crescent-shaped sidewall reinforcing rubber can be obtained.

The cross-sectional shape and dimensions of the groove 10 may be varied. But, in this embodiment, they are constant along the longitudinal direction of the groove.

Usually and in this embodiment, a thin innerliner 12 made of an air-impermeable rubber compound for preventing air leak is disposed axially inside the sidewall reinforcing rubber 9 so as to cover the substantially entirety of the inner surface of the tire including the inner surface of the sidewall reinforcing rubber 9, facing the tire cavity (i). In this case, the innerliner 12 should be considered as a part of the sidewall reinforcing rubber 9 in determining the shape and dimensions of the groove 10.

Figure 3:
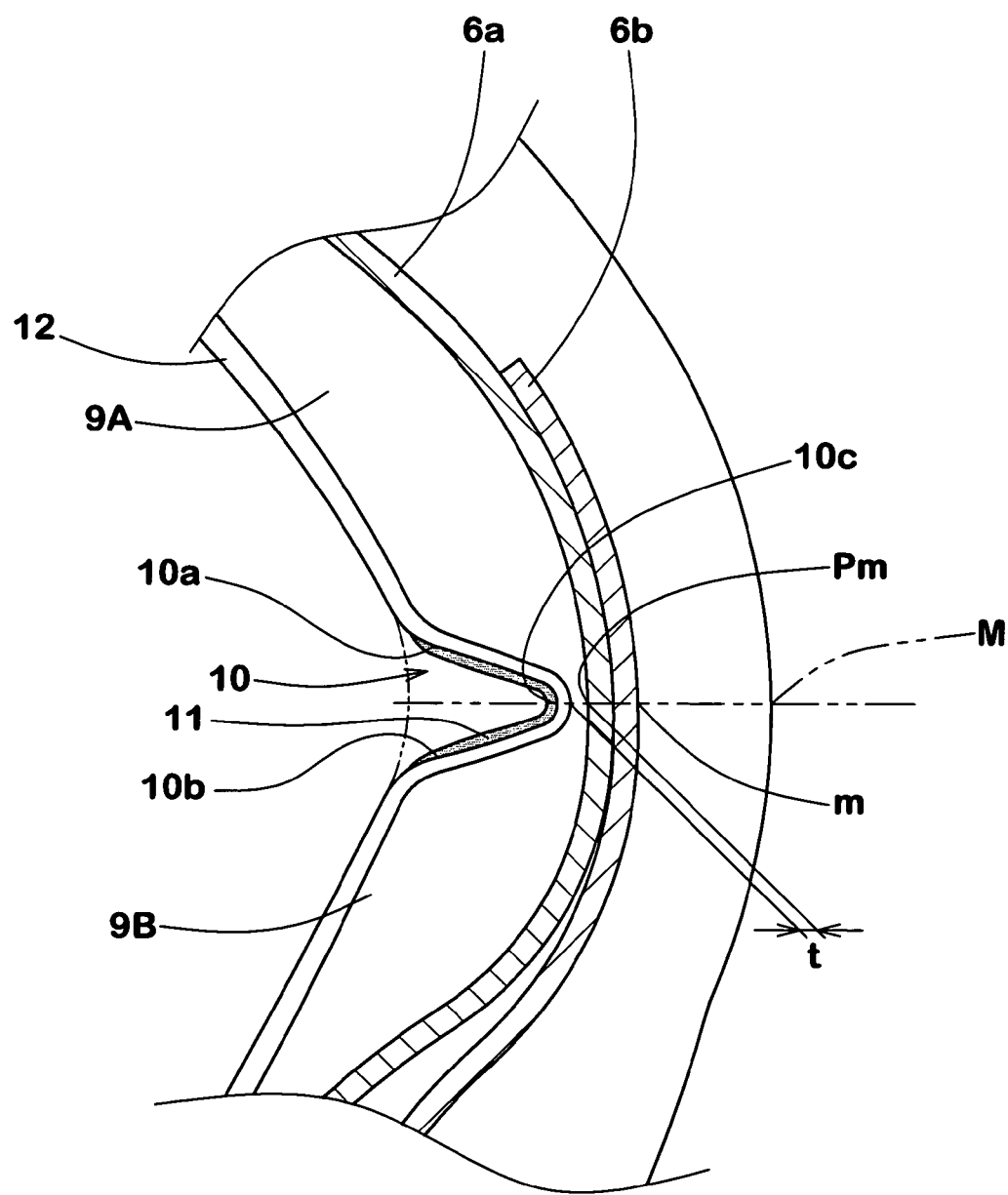
FIG. 3 is a cross sectional view of the grooved part of the sidewall portion thereof.

As to the position of the groove 10, in view of the ride comfort, it is preferable that the axial straight line, which is drawn passing through the maximum section width position m of the carcass 6 under the normally inflated unloaded state of the tire, is within a radial range from the radially outer edge Ea to the radially inner edge Eb of the groove 10. Namely, the groove 10 is formed at the substantially same radial position as the position m. In FIGS. 1, 2 and 3, the groove center or the deepest point is aligned with the position m. Incidentally, the radial position of the maximum section width position m in this embodiment is the same as that of the maximum tire section width position M.

In the case of passenger car tires or similar sized, it is preferable that the maximum width (opening width) w of the groove 10 is at least 3.0 mm, more preferably not less than 4.0 mm, still more preferably not less than 5.0 mm, but at most 15.0 mm, more preferably not more than 13.0 mm, still more preferably not more than 10.0 mm when measure in the radial direction under the normally inflated unloaded state of the tire.

If less than 3.0 mm, the groove walls 10a and 10b easily contact with each other even under normal tire loads. Thus, it is difficult to improve the ride comfort during normal running. If more than 15.0 mm, it is difficult to provide a sufficient vertical stiffness for the sidewall portion 3 during runflat conditions.

As to the depth GD of the groove 10, if too shallow, it becomes difficult to improve the ride comfort. If too deep, as the bending deformation of the carcass cords concentrations in a small area axially outside the groove 10. Thus, the durability becomes liable to decrease in such area. Therefore, the depth GD is preferably set in a range of not less than 1.0 times, more preferably not less than 1.5 times, but not more than 5.0 times, more preferably not more than 3.0 times the maximum width w.

Figure 4:
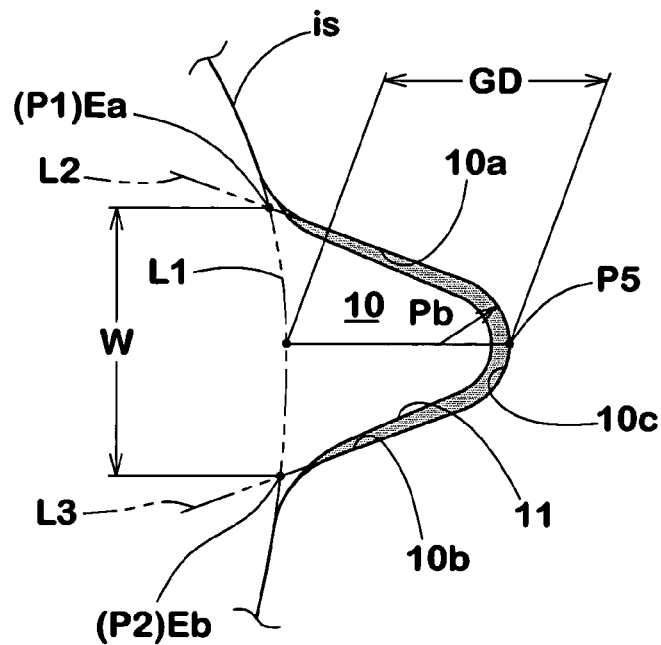
FIG. 4 is an enlarged cross sectional view for explaining the dimensions of the grooved part.

Although, the maximum width w of the groove 10 is the radial distance between the groove edges Ea and Eb, if the groove edges Ea and Eb are unclear due to rounding, as show in FIG. 4, points P1 and P2 can be used as the edges Ea and Eb, wherein the points P1 and P2 are intersecting points of extensions L2 and L3 of the groove walls 10a and 10b with an arc L1 which extends across the groove 10, smoothly connecting the inner surface (is) of the sidewall portion on both sides of the groove. The groove depth GD can be defined as the shortest distance from the deepest point P5 to the arc L1.

In order to reduced the friction and thereby to prevent a heat breakdown or fatigue, a lubricant 11 is applied to the groove walls 10a and 10b and groove bottom 10c.

Various materials, e.g. oil, grease, paste and the like can be used as the lubricant 11. Preferably, glycerol-based grease, especially, a grease containing a polyglycol as a base oil is used. Further, it is preferable that such grease contains silica as a thickener.

In order to prevent the lubricant from flowing out from the groove by the centrifugal force etc., and to control heat generation from the lubricant, further to properly function as lubricant even under high temperature conditions, it is preferable that the lubricant 11 has the following properties: the kinetic viscosity at 100 deg.C. is not less than 20 cst, more preferably not less than 25 cst, but not more than 50 cst; and the kinetic viscosity at 40 deg.C. is not less than 220 cst, more preferably not less than 230 cst, but not more than 280 cst, more preferably not more than 260 cst. Here, the kinetic viscosity is measured according to ASTM D-445.

Further, the worked penetration is not less than 235, more preferably not less than 240. Here, the worked penetration is measured according to ASTM D-217 standard Test Method for Cone Penetration of Lubricating Grease, after the sample having a temperature of 25 deg.C. has been worked with 60 strokes by the use of a grease working machine.

Figure 5:
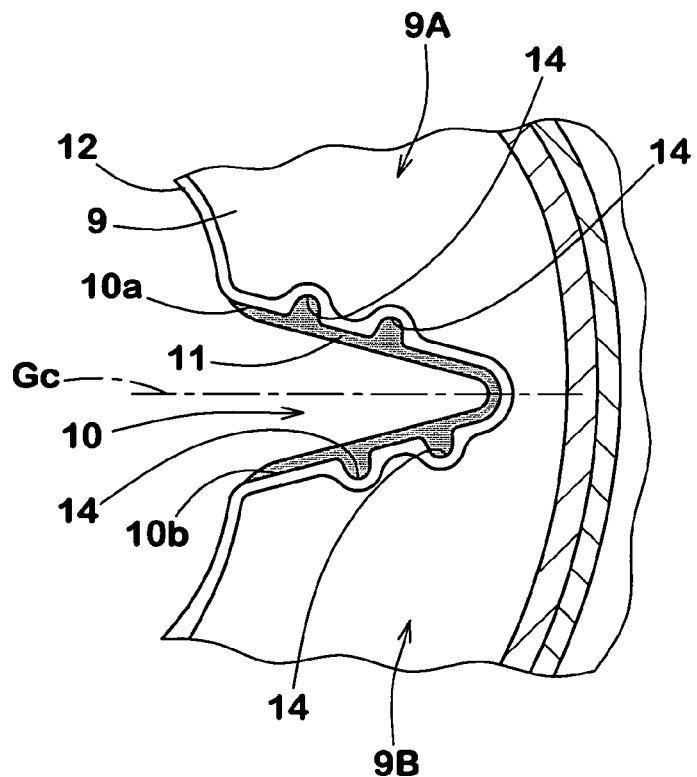
FIG. 5 is a cross sectional view of another example of the grooved part.

FIG. 5 shows a modification of the groove wall 10a, 10b, in which at least one of the groove walls 10a and 10b is provided with narrow grooves 14 for reserving the lubricant. The width and depth of the narrow groove 14 are set in a range of from about 0.5 to about 2.0 mm. In this example, the narrow grooves 14 extend continuously in the circumferential direction, but it is also possible to form the narrow groove discontinuously in the circumferential direction. Further, the narrow grooves 14 are formed at asymmetrical positions about the groove center line Gc. More specifically, the narrow grooves 14 on the outer wall 10a are axially shifted from the narrow grooves 14 on the inner wall 10b.

Aside from such narrow grooves 14, for the purpose of reserving the lubricant, serration slots may be provided instead of the narrow grooves 14. Further, the surface of the groove 10 may be roughened.

The groove 10 in this embodiment extends straight in the circumferential direction. But, the groove 10 can be formed in nonlinear configurations.

Figure 6:
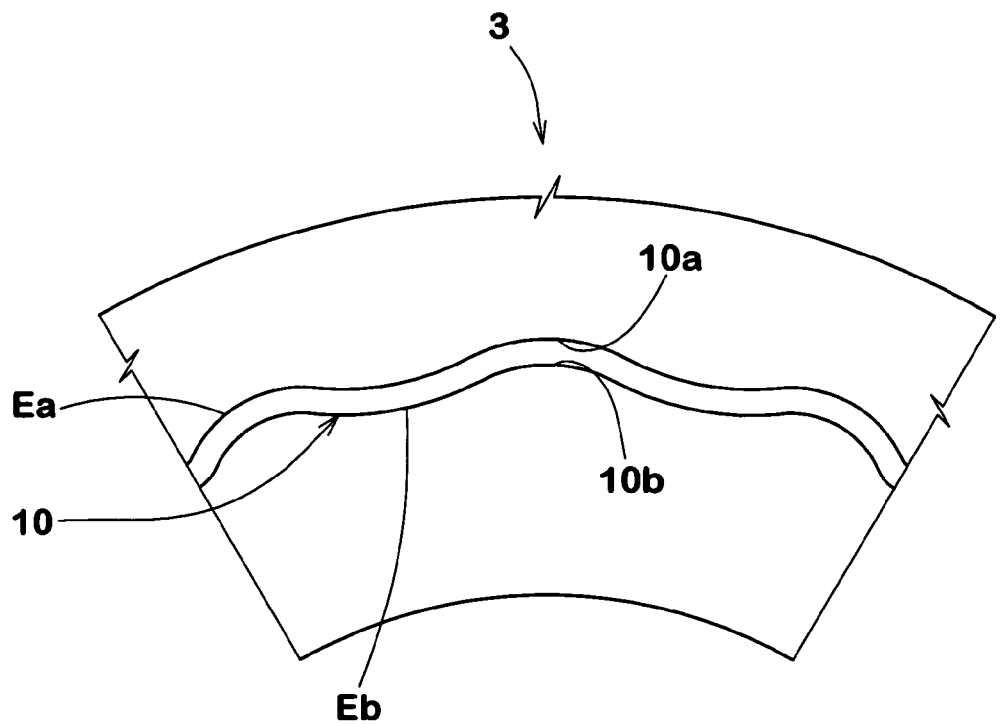
FIG. 6 is a partial view of the sidewall portion viewed from the inside of the tire, showing an example of the configuration of the groove.
Figure 7:
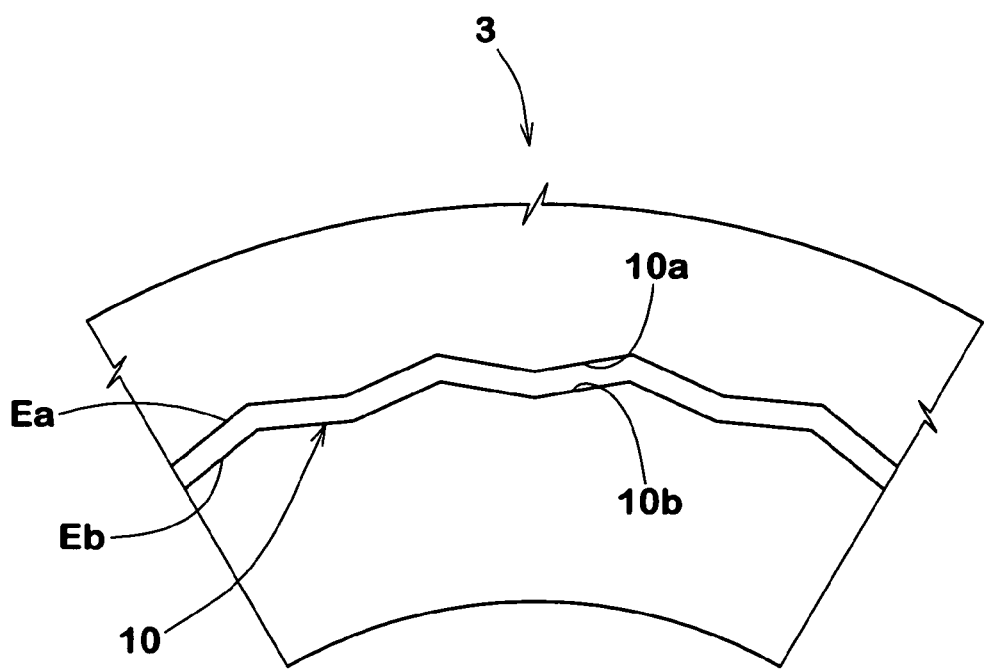
FIG. 7 is a partial view of the sidewall portion viewed from the inside of the tire, showing another example of the configuration of the groove.

FIGS. 6 and 7 show modifications of the groove 10. In FIG. 6, the groove 10 has a wavy configuration (substantially sinusoidal waveform) along the longitudinal direction thereof. In FIG. 7, the groove 10 has a zigzag configuration along the longitudinal direction thereof. In the case of such nonlinear configurations, when the wall 10a contacts with the wall 10b under runflat conditions, the walls 10a and 10b can engage with each other, and the circumferential slippage therebetween can be prevented. As a result, frictional heat generation can be effectively prevented, and further braking performance under runflat conditions can be improved.

Figure 8:
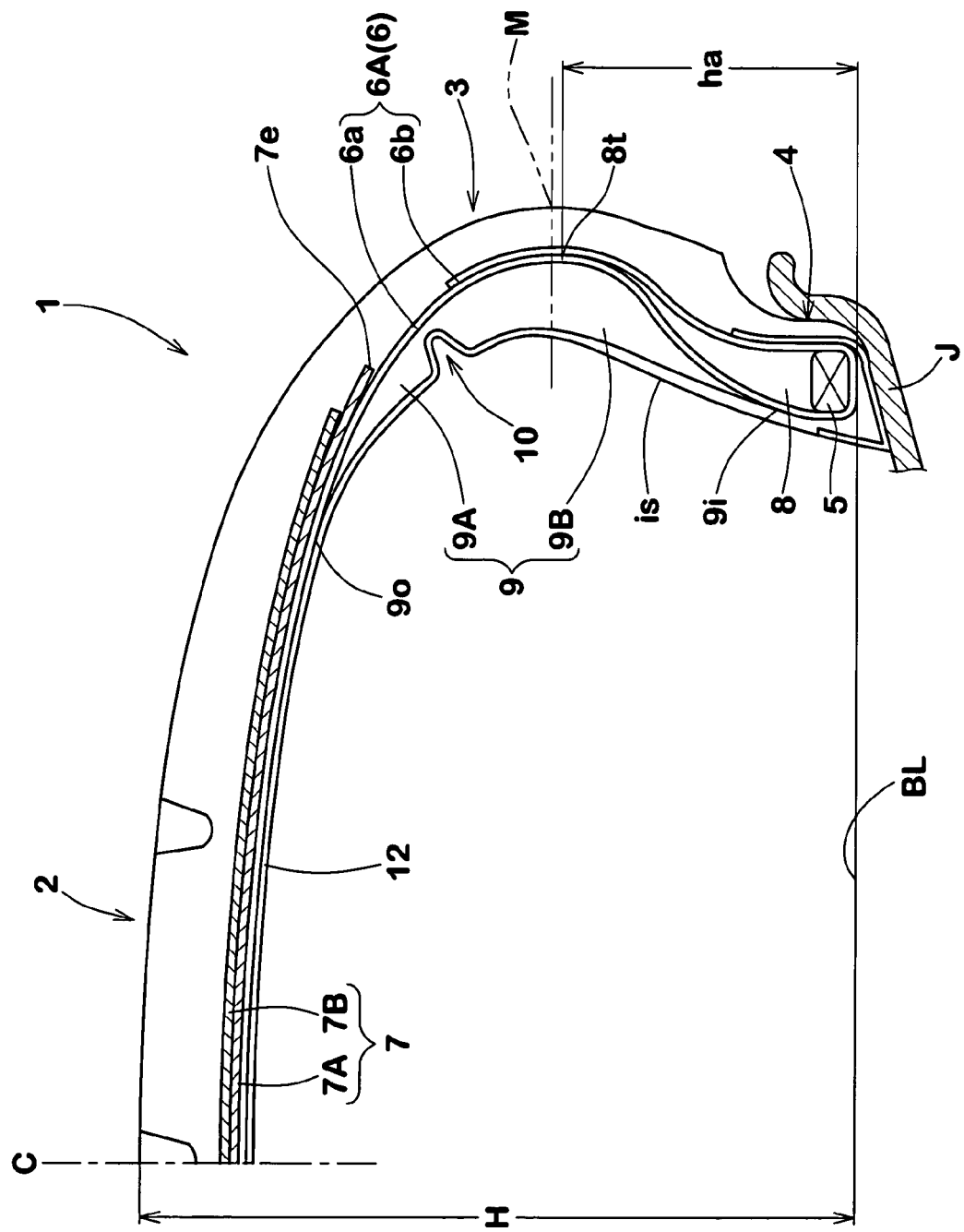
FIG. 8 is a cross sectional view showing a modification of the runflat tire shown in FIG. 1.

FIG. 8 shows a modification of the sidewall reinforcing rubber 9, in which the groove 10 is formed radially outside the maximum section width position m. In this example, when compared with the former example shown in FIG. 1 to 3, as the groove 10 is located near the tread portion 2, vibrations and shock applied to the tread portion during normal running are absorbed more effectively by the deformation of the grooved part. Thus, it becomes possible to improve the ride comfort furthermore.

Figure 9:
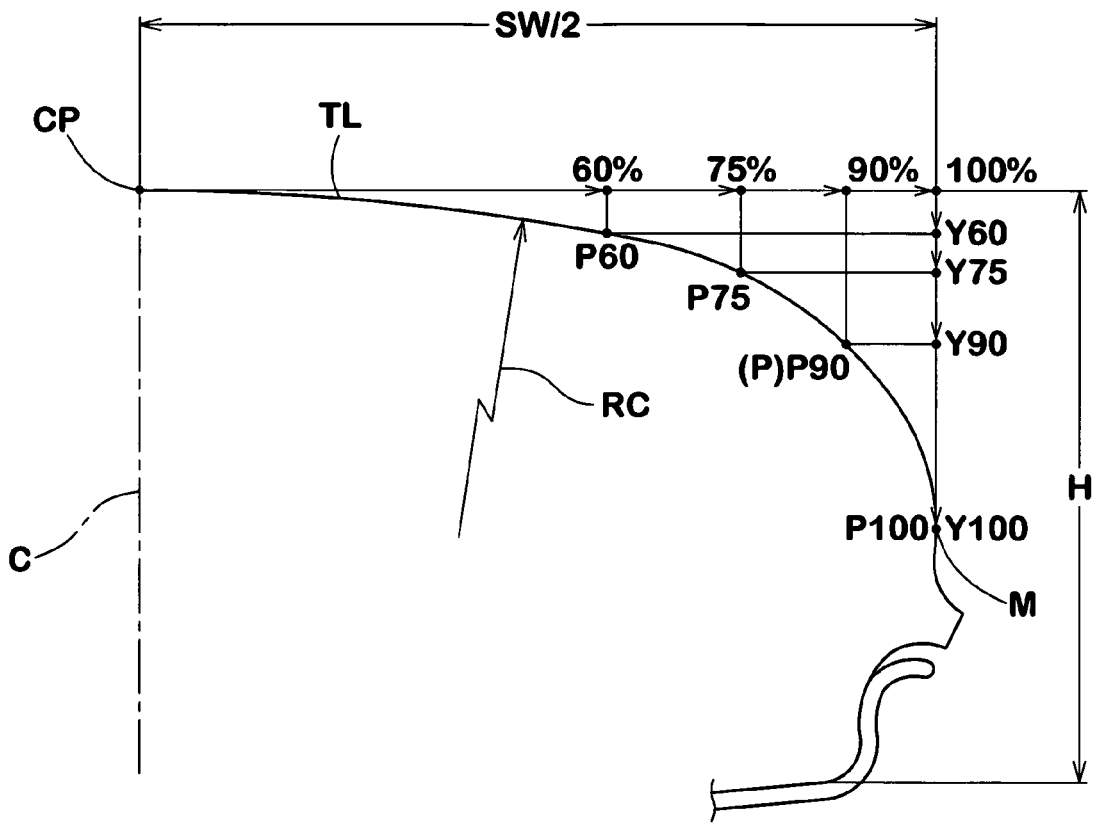
FIGS. 9 and 10 are diagrams for explaining a tire profile suitable for the runflat tire according to the present invention.

FIG. 9 shows a tire profile TL under the normally inflated unloaded state. This profile TL, which is proposed in Japanese Patent No. 2994989 (Publication No. JP-A-8-337101), is suitable for the runflat tire 1 according to the present invention.

The tire profile TL has a multi radius or a variable radius of curvature RC which gradually decreases from the tire equator point CP to a point P90 on each side thereof so as to satisfy the following conditions:

$$0.05 < Y60/H =< 0.1$$

$$0.1 < Y75/H =< 0.2$$

$$0.2 < Y90/H =< 0.4$$

$$0.4 < Y100/H =< 0.7$$

wherein
"H" is the tire section height, and
"Y60", "Y75", "Y90" and "Y100" are radial distances from the tire equator point CP to a point P60; a point P75, the point P90 and a point P100, respectively. The points P60, P75, P90 and P100 are defined on each side of the tire equator point CP as the points on the profile TL spaced apart from the tire equator point CP by axial distances of 60%, 75%, 90% and 100%, respectively, of one half of the maximum tire section width SW between the positions M.

Figure 10:
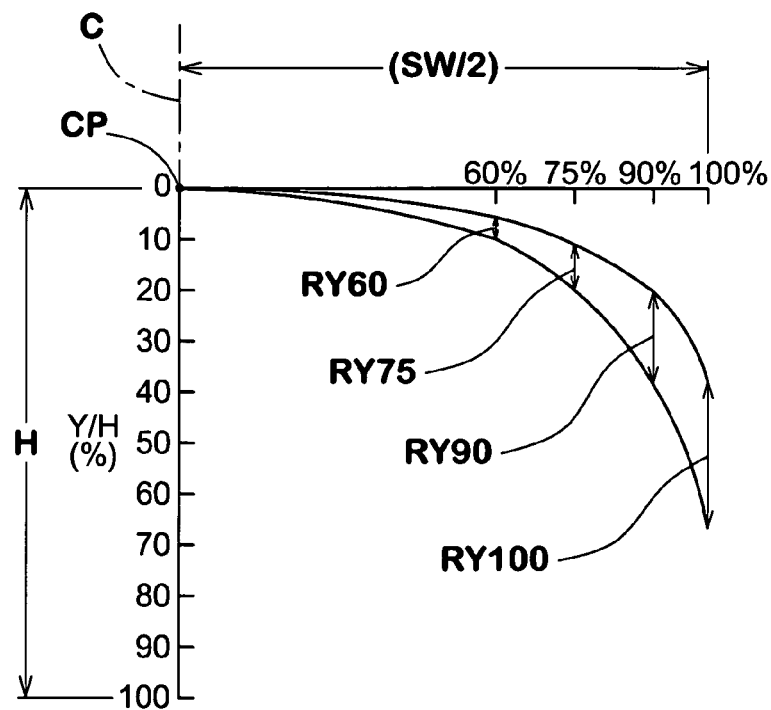

FIG. 10 is a graph showing the range RY60 for the value Y60/H, the range RY75 for the value Y75/H, the range RY90 for the value Y90/H and the range RY100 for the value Y100/H, wherein the curve P1 is an envelope of the lower limits of the ranges, and the curve P2 is an envelope of the upper limits of the ranges. The profile TL lies between the curves P1 and P2.

In the tire 1 having such special profile, the sidewall-reinforcing rubber 10 is decreased in the dimension in the radial direction when compared with the conventional profiles. Therefore, in cooperation with the formation of void by the groove, a significant weight reduction is possible.

The runflat tire 1 can be manufactured as follows;

As usual, a green tire is first formed, using a tire building drum. Then, the tire is vulcanized in a mold by applying heat and pressure.

Figure 11:
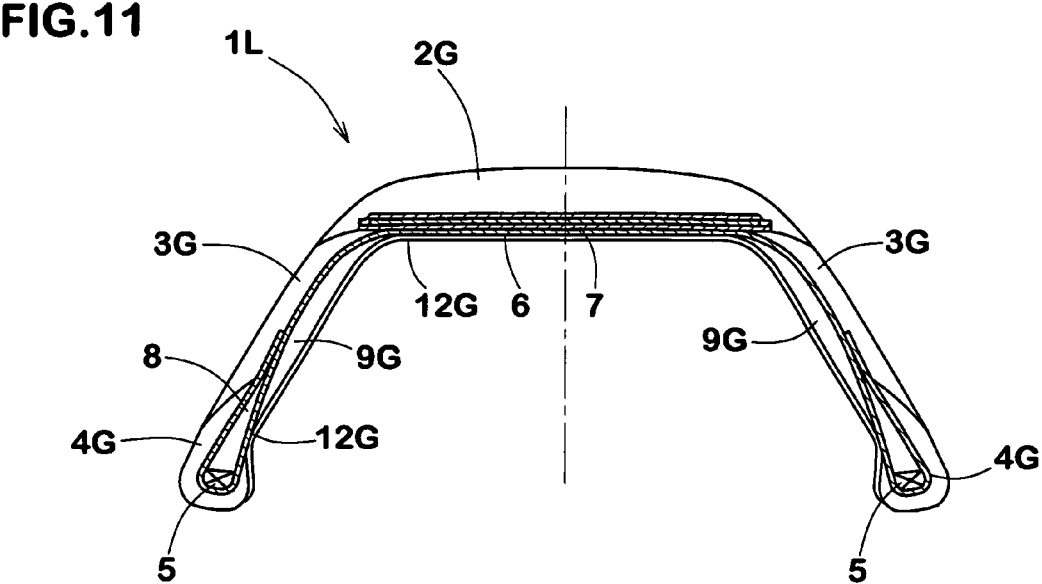
FIG. 11 is a cross sectional view of the runflat tire before vulcanization.

In the green tire 1L, as shown in FIG. 11, raw rubber tire components are applied to a base structure made up of the carcass 6, bead cores 5 and the belt 7. The raw rubber tire components include the above-mentioned sidewall reinforcing rubber 9G, the innerliner rubber 12G, a tread rubber 2G, sidewall rubber 3G, and clinch rubber (bead rubber) 4G.

In this raw state, the groove 10 is not yet formed on the raw sidewall reinforcing rubber 9G. Thus, the raw sidewall reinforcing rubber 9G has a crescent cross sectional shape.

Figure 12:
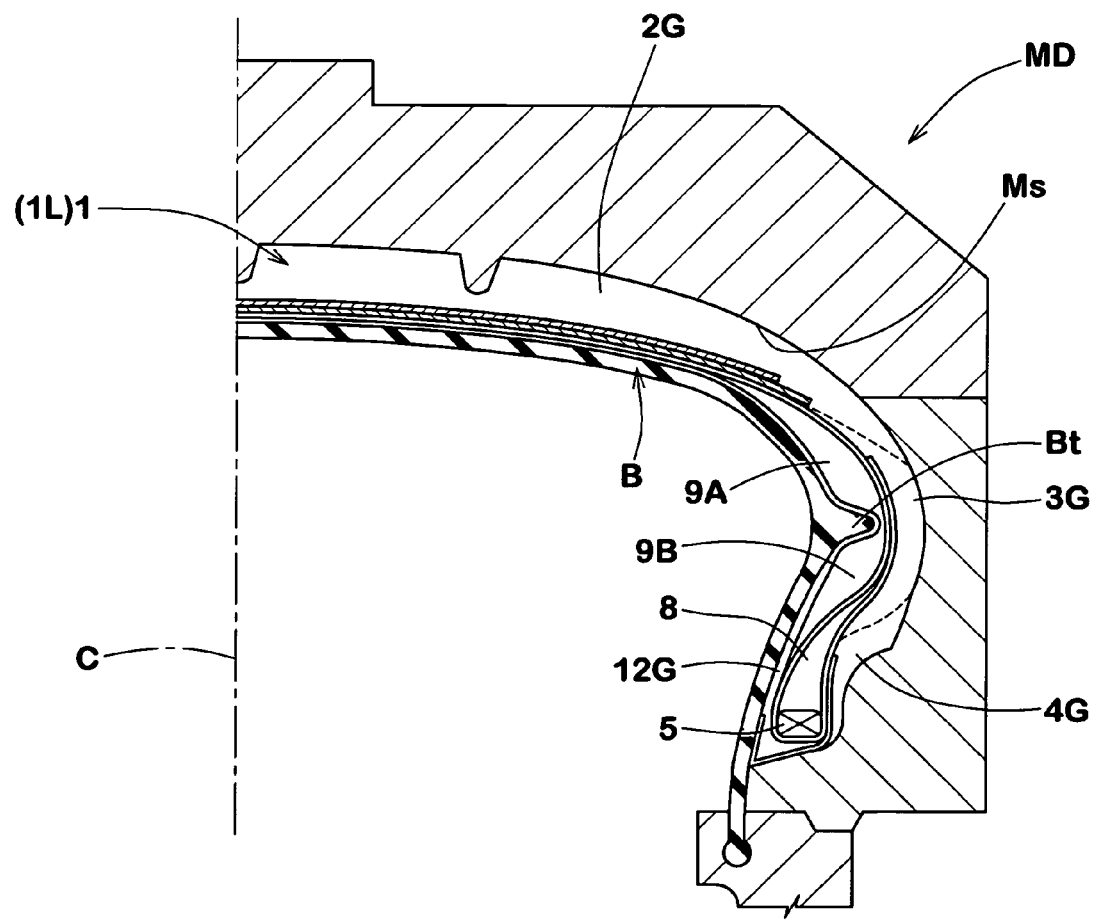
FIG. 12 is a cross sectional view of the runflat tire during vulcanization, showing a bladder according to the present invention.

In the tire vulcanizing process, as shown in FIG. 12, the green tire 1L is put in the split mold MD, and an inflatable bladder B is inserted in the tire cavity (i). The bladder B is inflated with a high pressure heat medium in order to press the tire outer surface against the shaping surface Ms of the mold MD and to heat the tire from the inside.

In this invention, the outer surface of the bladder B is provided on each side thereof with a protrusion Bt for molding the groove 10. As the groove 10 in this example is continuous in the tire circumferential direction, the protrusion Bt is also continuous.

Figure 13:
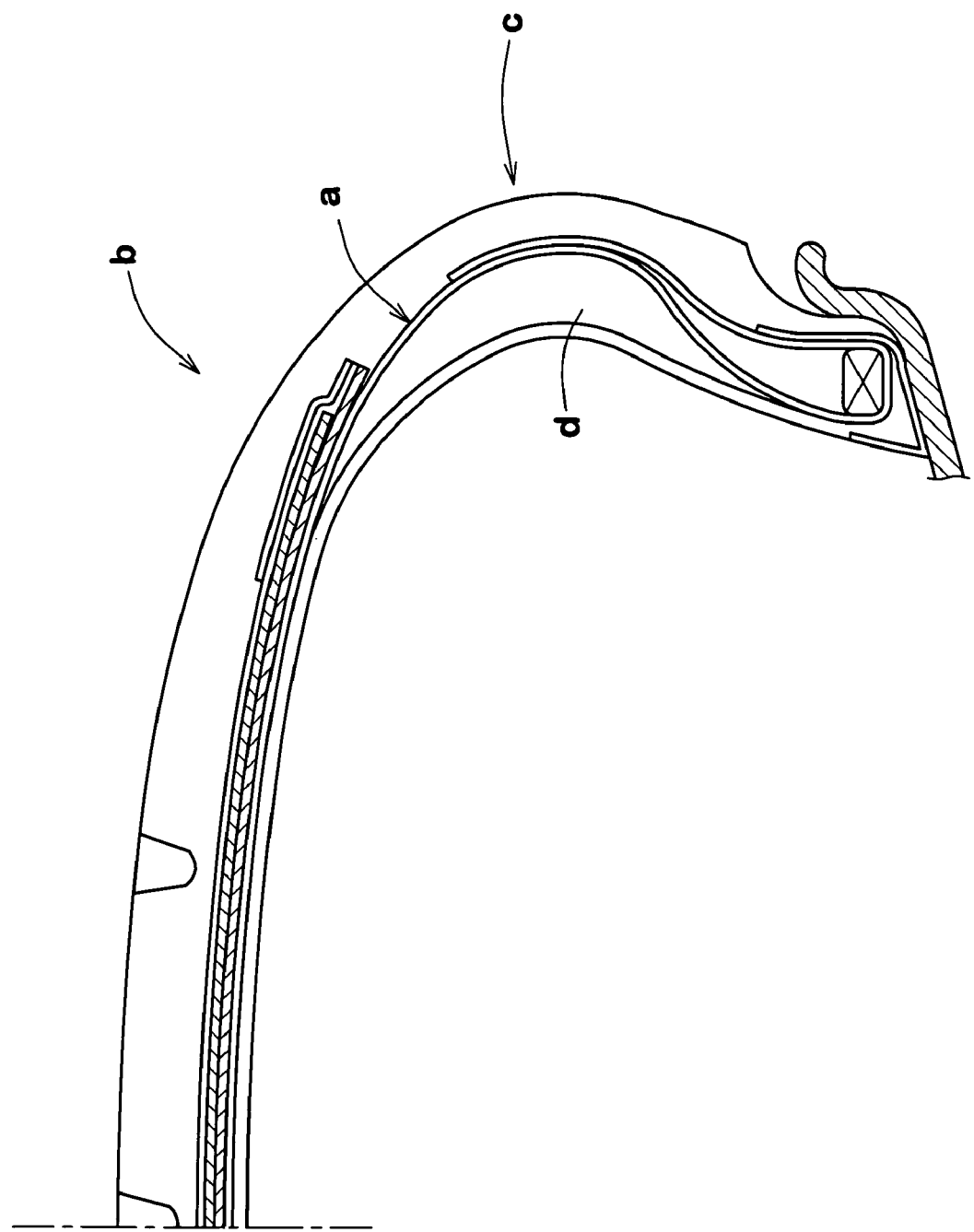
FIG. 13 is a cross sectional view of a runflat tire used in the undermentioned comparison tests as Reference tires 1 and 2 having a conventional crescent-shaped sidewall reinforcing rubber.

Aside from such special bladder B, a metallic core or the like may be used instead. Further, it is also possible to form the groove 10 by means of cutting after vulcanization of the tire having a sidewall reinforcing rubber having a crescent shape as shown in FIG. 13.

Comparison Tests

Test tires of size 245/40R18 having specifications shown in Table 1 were manufactured and tested for the runflat performance, ride comfort and tire weight.

Except for the sidewall reinforcing rubber, all the test tires had the same internal structure, including: the belt consisting of a breaker 7 consisting of two cross plies 7A and 7B of steel cords; and the carcass 6 consisting of a ply 6A of rayon cords. The maximum thickness T of the sidewall reinforcing rubber was 10 mm, and the thickness t at the deepest point 5P was 3 mm. The example tire Ex. 6 was provided in the groove 10 with the narrow grooves shown in FIG. 5, whereas the rest were provided with the grooves 10 having the smooth walls 10a and 10b as shown in FIG. 4.

Runflat Performance Test:

The tire was mounted on a standard wheel rim of size 18×8.5-JJ and then the air valve core was removed from the wheel rim to deflate the tire. using a 1.7 meter dia. tire test drum, the deflated tire was run at a speed of 80 km/hr, applying a tire load of 4.31 kN, until the tire was broken in order to obtain the runflat distance. The results are indicated in Table 1 by an index based on Ref. 1 being 100. The larger the value, the better the runflat performance.

Ride Comfort Test:

using a Japanese 3000cc FR passenger car provided on the four wheels with the test tires as a test car, the test car was run on dry rough roads (including asphalt road, stone-paved road and graveled road) and the test driver evaluated the ride comfort, based on harshness, damping, thrust-up, etc. (Tire pressure: 230 kPa, Rim size: 18×8.5JJ) The test results are indicated in Table 1 by an index based on Ref. tire 1 being 100. The larger the index, the better the ride comfort.

Tire Weight:

The weight of the test tire was measured and indicated in Table 1 by an index based on Ref. 1 being 100.

From the test results it was confirmed that the ride comfort can be improved without sacrificing the runflat performance.

TABLE 1

|  | Tire | | | | | | | | |
| --- | --- | --- | --- | --- | --- | --- | --- | --- | --- |
|  | Ref. 1 FIG. 13 | Ref. 2 FIG. 13 | Ref. 3 FIG. 1 | Ex. 1 FIG. 1 | Ex. 2 FIG. 1 | Ex. 3 FIG. 1 | Ex. 4 FIG. 8 | Ex. 5 FIG. 1 | Ex. 6 FIG. 1 |
| Groove 10 | non | non | FIG. 3 | FIG. 3 | FIG. 3 | FIG. 3 | FIG. 3 | FIG. 3 | FIG. 5 |
| Maximum width W (mm) | — | — | 6.0 | 6.0 | 3.0 | 1.0 | 3.0 | 3.0 | 3.0 |
| Depth GD (mm) | — | — | 7.0 | 7.0 | 7.0 | 7.0 | 7.0 | 7.0 | 7.0 |
| GD/W | — | — | 1.17 | 1.17 | 2.33 | 7.0 | 2.33 | 2.33 | 2.33 |
| Radius Rb of bottom (mm) | — | — | 2.0 | 2.0 | 2.0 | 1.0 | 1.5 | 1.5 | 1.5 |
| Lubricant *1 | N | N | N | Y | Y | Y | Y | Y | Y |
| Kinetic viscosity |  |  |  |  |  |  |  |  |  |
| @40 deg. C. (cst) | — | — | — | 250 | 250 | 250 | 250 | 240 | 250 |
| @100 deg. C. (cst) | — | — | — | 30 | 30 | 30 | 30 | 15 | 30 |
| Tire profile *2 | A | B | B | A | B | A | A | A | A |

TABLE 1-continued

| | Tire | | | | | | | | |
|---|---|---|---|---|---|---|---|---|---|
| | Ref. 1 FIG. 13 | Ref. 2 FIG. 13 | Ref. 3 FIG. 1 | Ex. 1 FIG. 1 | Ex. 2 FIG. 1 | Ex. 3 FIG. 1 | Ex. 4 FIG. 8 | Ex. 5 FIG. 1 | Ex. 6 FIG. 1 |
| Tire weight | 100 | 95.0 | 93.0 | 98.0 | 94.0 | 99.0 | 98.5 | 98.5 | 98.5 |
| Runflat distance | 100 | 105 | 60 | 85 | 100 | 95 | 95 | 85 | 95 |
| Ride comfort | 100 | 105 | 120 | 120 | 110 | 105 | 110 | 105 | 105 |

*1 N: not applied, Y: applied
*2 A: Y60/H = 0.06, Y75/H = 0.08, Y90/H = 0.19, Y100/H = 0.57 B: Y60/H = 0.09, Y75/H = 0.14, Y90/H = 0.37, Y100/H = 0.57

The invention claimed is:

1. A pneumatic tire comprising
a tread portion,
a pair of axially spaced bead portions each with a bead core therein,
a pair of sidewall portions extending between the tread edges and the bead portions,
a carcass extending between the bead portions through the tread portion and sidewall portions,
a belt disposed radially outside the carcass in the tread portion,
a bead apex disposed in each said bead portions so as to extend radially outwardly from the radially outside of the bead core while tapering towards the radially outer end thereof, and
a sidewall reinforcing rubber disposed axially inside the carcass in each said sidewall portion, wherein
the sidewall reinforcing rubber extends radially outwardly and inwardly from a maximum section width position (m) of the carcass under a normally inflated unloaded state of the tire so as to have a radially outer end positioned axially inside an axial edge of the belt and beneath the belt, and a radially inner end positioned radially inside the radially outer end of the bead apex, but radially outside the bead core, and
the axially inner surface of the sidewall reinforcing rubber is grooved so that the axially inner surface of each said sidewall portion is provided with a single groove opened toward the inside of the tire, and the groove extends circumferentially of the tire so that, when the tire mounted on a wheel rim and normally loaded is deflated, the groove in a ground contacting patch is closed,
said groove is disposed at the substantially same radial position as said maximum section width position such that an axial straight line, which is drawn passing through the maximum section width position of the carcass, is positioned within a radial range from the radially outer edge to the radially inner edge of the groove, and
the thickness of the sidewall reinforcing rubber is smoothly and continuously decreased from the grooved part to each of the radially outer end and inner end of the sidewall reinforcing rubber,
the bottom of the groove is formed with a radius of curvature of not less than 1 mm but not more than 7 mm under the normally inflated unloaded state of the tire,
the thickness of the sidewall reinforcing rubber at the bottom of the groove is not more than 8 mm but not less than 1 mm,
the groove has an opening width in a range of not less than 3.0 mm, but not more than 15.0 mm, and a depth in a range of not less than 1.0 times, but not more than 5.0 times the opening width, wherein
said groove has a wavy configuration or alternatively a zigzag configuration so that when the groove is closed in the ground contacting patch, the opposite walls of the groove can engage with each other.

2. The tire according to claim 1, wherein
when the tire normally inflated is loaded with a maximum load for the tire, the groove is still opened.

3. The tire according to claim 1, wherein
the groove has a lubricant applied to the surface of the groove.

4. The tire according to claim 3, wherein
the lubricant has a kinetic viscosity at 100 deg.C of not less than 20 cSt, and a kinetic viscosity at 40 deg.C of not less than 220 cSt, but not more than 280 cSt, when measured according to ASTM D-445.

5. The tire according to claim 1, which is provided with a tire profile having a radius of curvature which gradually decreases from the tire equator point CP to a point P90 on each side thereof so as to satisfy the following conditions:

$$0.05 < Y60/H = < 0.1$$

$$0.1 < Y75/H = < 0.2$$

$$0.2 < Y90/H = < 0.4$$

$$0.4 < Y100/H = < 0.7$$

wherein
"H" is the section height of the tire, and
"Y60", "Y75", "Y90" and "Y100" are radial distances from the tire equator point CP to a point P60, a point P75, the point P90 and a point Pl00, respectively,
wherein
the points P60, P75, P90 and Pl00 are defined on each side of the tire equator point CP as the points on the profile spaced apart from the tire equator point CP by axial distances of 60%, 75%, 90% and 100%, respectively, of one half of the maximum tire section width.

6. A pneumatic tire comprising
a tread portion,
a pair of axially spaced bead portions each with a bead core therein,
a pair of sidewall portions extending between the tread edges and the bead portions,
a carcass extending between the bead portions through the tread portion and sidewall portions,
a belt disposed radially outside the carcass in the tread portion,
a bead apex disposed in each said bead portions so as to extend radially outwardly from the radially outside of the bead core while tapering towards the radially outer end thereof, and
a sidewall reinforcing rubber disposed axially inside the carcass in each said sidewall portion, wherein
the sidewall reinforcing rubber extends radially outwardly and inwardly from a maximum section width position (m) of the carcass under a normally inflated unloaded state of the tire so as to have a radially outer end positioned axially inside an axial edge of the belt and beneath the belt, and a radially inner end positioned radially inside the radially outer end of the bead apex, but radially outside the bead core, and the axially inner surface of the sidewall reinforcing rubber is grooved so that the axially inner surface of each said sidewall portion is provided with a single groove opened toward the inside of the tire, and the groove extends circumferentially of the tire so that, when the tire mounted on a wheel rim and normally loaded is deflated, the groove in a ground contacting patch is closed, said groove is disposed at the substantially same radial position as said maximum section width position such that an axial straight line, which is drawn passing through the maximum section width position of the carcass, is positioned within a radial range from the radially outer edge to the radially inner edge of the groove, and the thickness of the sidewall reinforcing rubber is smoothly and continuously decreased from the grooved part to each of the radially outer end and inner end of the sidewall reinforcing rubber, the bottom of the groove is formed with a radius of curvature of not less than 1 mm but not more than 7 mm under the normally inflated unloaded state of the tire, the thickness of the sidewall reinforcing rubber at the bottom of the groove is not more than 8 mm but not less than 1 mm, the groove has an opening width in a range of not less than 3.0 mm, but not more than 15.0 mm, and a depth in a range of not less than 1.0 times, but not more than 5.0 times the opening width, wherein said groove has a lubricant applied to the surface of the groove, and said groove has radially outer and inner groove walls each provided with a circumferentially-extending narrow groove for reserving the lubricant, and the narrow groove on the radially outer groove wall is axially shifted from the narrow groove on the radially inner groove wall.

7. The tire according to claim 6, wherein the width and depth of the narrow grooves are in a range of from 0.5 to 2.0 mm.

8. The tire according to claim 6, which is provided with a tire profile having a radius of curvature which gradually decreases from the tire equator point CP to a point P90 on each side thereof so as to satisfy the following conditions:

$$0.05 < Y60/H =< 0.1$$

$$0.1 < Y75/H =< 0.2$$

$$0.2 < Y90/H =< 0.4$$

$$0.4 < Y100/H =< 0.7$$

wherein

"H" is the section height of the tire, and

"Y60", "Y75", "Y90" and "Y100" are radial distances from the tire equator point CP to a point P60, a point P75, the point P90 and a point P100, respectively, wherein the points P60, P75, P90 and P100 are defined on each side of the tire equator point CP as the points on the profile spaced apart from the tire equator point CP by axial distances of 60%, 75%, 90% and 100%, respectively, of one half of the maximum tire section width.

\* \* \* \* \*